No. 668,310. Patented Feb. 19, 1901.
E. W. HOWELL.
PROCESS OF REFRIGERATION.
(Application filed July 11, 1899. Renewed Jan. 18, 1901.)

(No Model.) 6 Sheets—Sheet 1.

WITNESSES:

INVENTOR
Edward W. Howell
BY
ATTORNEY

No. 668,310. Patented Feb. 19, 1901.
E. W. HOWELL.
PROCESS OF REFRIGERATION.
(Application filed July 11, 1899. Renewed Jan. 18, 1901.)
(No Model.) 6 Sheets—Sheet 4.

WITNESSES:

INVENTOR
Edward W. Howell
BY
ATTORNEY

UNITED STATES PATENT OFFICE.

EDWARD W. HOWELL, OF NEW YORK, N. Y., ASSIGNOR TO THE DRY AIR REFRIGERATOR COMPANY, OF SAME PLACE.

PROCESS OF REFRIGERATION.

SPECIFICATION forming part of Letters Patent No. 668,310, dated February 19, 1901.

Application filed July 11, 1899. Renewed January 18, 1901. Serial No. 43,830. (No model.)

*To all whom it may concern:*

Be it known that I, EDWARD W. HOWELL, a citizen of the United States, residing at New York, borough of Manhattan, in the county of New York and State of New York, have invented certain new and useful Improvements in Processes of Artificial Refrigeration; and I do hereby declare the following to be a full, clear, and exact description of the invention, such as will enable others skilled in the art to which it appertains to make and use the same.

This invention relates to artificial refrigeration produced by the expansion of gas—ammonia, for example—in convoluted pipes or coils. Two systems of refrigeration by ammonia are known—viz., the compression system and the absorption system. In the former refrigeration is produced by the expansion of liquid anhydrous ammonia in coils of pipe termed the "expander" or "refrigerating" coils. After expanding the ammonia is again compressed by means of a compression-pump and driven into another system of pipes called the "condenser." The condenser is cooled by running water, which takes away from the ammonia in the coils the heat which it acquired through the compression, as well as the heat which it absorbed when evaporated in the expander. Owing to both pressure and the withdrawal of heat, the ammonia assumes its liquid form again to pass into the expander, thus repeating its circulation over and over again. The compression system necessitates the use of power to operate the pump. The expense of running the system is therefore considerable, and in addition much ammonia is lost through leakage. In the absorption system aqua-ammonia is distilled in a generator. The gas which is distilled off is conducted to a condenser, where by means of pressure and cooling by running water it assumes a liquid form (anhydrous ammonia) and passes into a receiver, from which it is led to the refrigerating-coil, where it is expanded, and is then returned to a vessel called an "absorber," where it meets the weak liquor from which it was distilled, and being absorbed thereby the enriched liquor passes from the absorber back into the generator, to be again distilled. To make this system continuous and rapid, the temperature of the liquor while absorbing the gas must be kept down by cooling, generally by means of running water; otherwise temperature and pressure rise and absorption is stopped. Unless a constant supply of the cooling medium is used expansion must be stopped when temperature and pressure rise until the liquor cools down, when it can be continued. In this case the system acts intermittently. If the vessel in which the absorption is carried on is provided with an outlet and an outwardly-opening check-valve, when the weak liquor remaining in the vessel after distillation cools down a vacuum will be formed and the check-valve will be closed by atmospheric pressure. Now if the expanded gas from the refrigerating-coil is led into the cold weak liquor absorption will take place and continue until the liquor is heated to the point where absorption is checked— say about 60° Fahrenheit—whereupon free gas will accumulate in the space above the liquor and break the vacuum. The check-valve will be forced open and the hot gas expelled, whereupon the check-valve will close, and as the liquor cools down absorption will continue. If the accumulated gas be forcibly drawn out of the vessel, the absorption will proceed more rapidly, as the suction will remove the hot gas, so that absorption will go on without sensible interruption. If a second vessel be placed above the vessel referred to, and a pipe connected with said opening and the bottom of the second vessel to furnish communication between the top of the bottom vessel and bottom of the upper vessel and a check-valve opening toward the latter be placed in the pipe and the charge of aqua-ammonia be equally divided between the vessels, so that after distillation about the same quantity of weak liquor will remain in each and after cooling down a vacuum will be formed in each vessel when absorption proceeds for some time in the first vessel, heat and pressure will develop, the check-valve will be forced open by the pressure, and the hot gas will be drawn out of the first vessel up into the second by suction. The temperature of the weak liquor in the first vessel will be reduced and absorption will continue. More or less of the gas entering the second vessel will be absorbed by the weak liquor therein. Hence practically no pressure will develop therein, and the vacuum will not be broken until the absorption in the first vessel diminishes and the gas enters the weak liquor in the second vessel so rapidly that it will not be entirely absorbed and hot gas will accumulate in the second vessel and pressure develop. If a third vessel be placed above the second and communication between them be provided for the same as between the first and second vessels and the charge of aqua-ammonia be divided equally between the three vessels, so that after distillation about the same quantity of weak liquor will remain in each of the three vessels and a vacuum be formed in each vessel when the liquor cools down, when the hot gas accumulates in the second vessel and forces open the check-valve in the pipe leading to the third vessel the hot gas will come under the influence of the vacuum in the third vessel and be drawn up by suction into the weak liquor in the third vessel and absorption of the gas coming up from and through the first vessel will continue in the second vessel. The gas that enters the third vessel is more or less absorbed by the weak liquor therein; but when absorption becomes less active in the second vessel for the reasons stated in the description of the operation in the first vessel the gas entering the third vessel will not be entirely absorbed. Hence the weak liquor will be heated, absorption checked, and the hot gas will accumulate in the third vessel and the vacuum be broken, whereupon pressure will develop therein. If the upper part of the third vessel be connected with the bottom of the first vessel by a pipe having a check-valve opening toward the bottom vessel, the hot gas developed in the third vessel will enter the said pipe, and when the pressure in the first vessel falls below that in the last it will force open the check-valve and enter the liquor in the first vessel and pass up through the same, and if the pressure in the second vessel falls below that now in the first vessel the check-valve in the pipe leading to the second vessel will be forced open and the gas will enter the weak liquor in said vessel and rise up through the same. Thus a circulation of the gas will be established, commencing with the entrance of the gas from the refrigerating-coils into the first or bottom vessel. Thence, proceeding through the series of vessels if the pressure in the lower vessel falls below that in the last vessel, gas will pass from the third or top vessel, returning to the first, the circulation continuing until the gas is all absorbed and the pressure becomes equal throughout.

From the above statement it will be understood that absorption can be carried on continuously or until the liquor is raised to the desired strength without the use of cooling-water and that back pressure can be prevented or arrested by withdrawing the accumulated gas before the pressure equals or exceeds that of the incoming expanded gas.

The principles set forth I have applied practically to an absorption system of artificial refrigeration. Hence my invention comprises certain processes or methods of promoting the absorption by the weak liquor of the expanded gas discharged into it from the refrigerating-coil and of preventing the development of back pressure in the same coil and the stopping of refrigeration by the checking or retarding of the absorption of the gas. These processes or methods will now be described in connection with the drawings of the apparatus in which they are carried on and afterward specifically pointed out in the claims.

In the accompanying drawings.

The apparatus is constructed in two parts, each of which forms a distinct generator system. The two parts, however, are arranged to be separately charged and operated and to discharge the products of distillation into a single pipe that conducts the gases to the condenser and to the anhydrous-ammonia receiver and also to receive the expanded gas after it has done its duty in the refrigerating-coil back through the same pipe, which, however, has branches leading to the bottom generators.

The object in dividing the system into two parts is to enable two distinct operations to be carried on simultaneously—namely, the distillation of the ammonia in one part and the restoration of the expanded gas and its absorption in the weak liquor from which it had been distilled in the other part.

The apparatus shown in the accompanying drawings is inclosed in a framework made of light angle-iron, and the generators and connecting-pipes which conduct the liquor and gases from and to the generators comprised in each part, as will hereinafter be described, are all connected with this framework in such a way that the entire apparatus can be moved bodily with the frame. This arrangement is adopted for convenience and to make it possible to move the apparatus with the greatest convenience from the factory to the place where it is to be used and to make the attachments with as little trouble as possible, the skilled labor required in setting up the apparatus being that which will be applied to making the connections between the single pipe leading from the generator to the condenser and receiver and the pipe leading from the anhydrous-ammonia receiver to the refrigerating-coil and the pipe leading from the exit end of the refrigerating-coil back to the generators and the connection between the condenser and the water-supply and waste pipe. This frame consists of the base-plates A A A A, uprights B B B B at the corners, and the intermediate uprights B′ B′, the top plates C C C C, and the transverse bars D D D at the front and rear ends of the frame. All these parts are securely bolted together to form a structure that can be moved as a whole. On the transverse bars D D D, at each end of the frame, are bolsters E E E on one side of the two parts into which the frame is divided by the middle uprights B′ B′, and on the other side are similar bolsters E′ E′ E′. The bolsters on their upper sides approximate to a semicircle to adapt them to receive the ends of the cylindrical generators, and they are bolted securely to the transverse bars.

Figure 1:
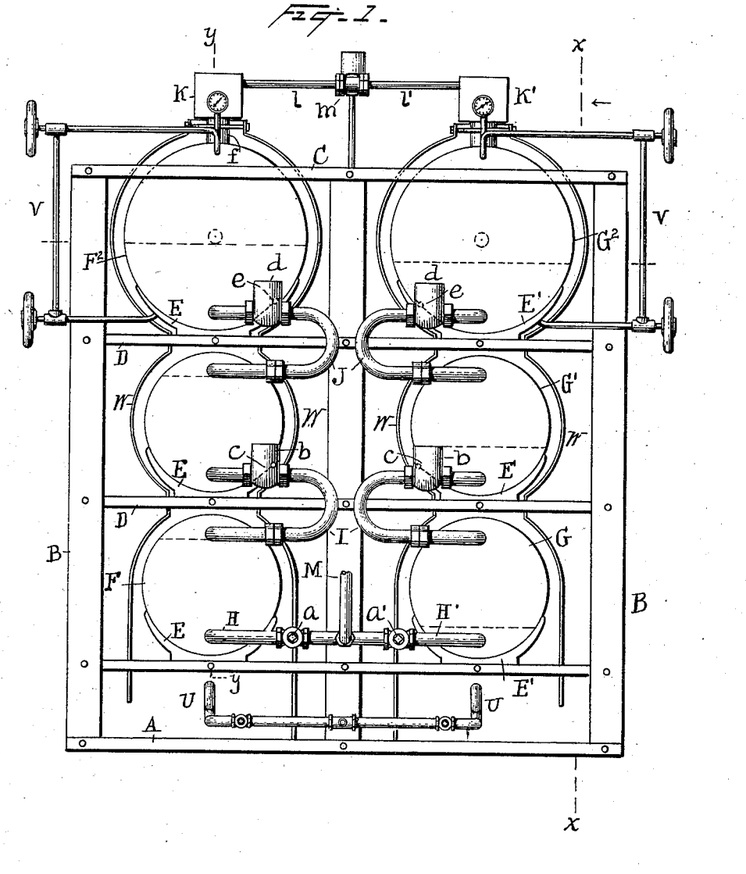
Figure 1 represents a front end elevation of the refrigerating apparatus.
Figure 4:
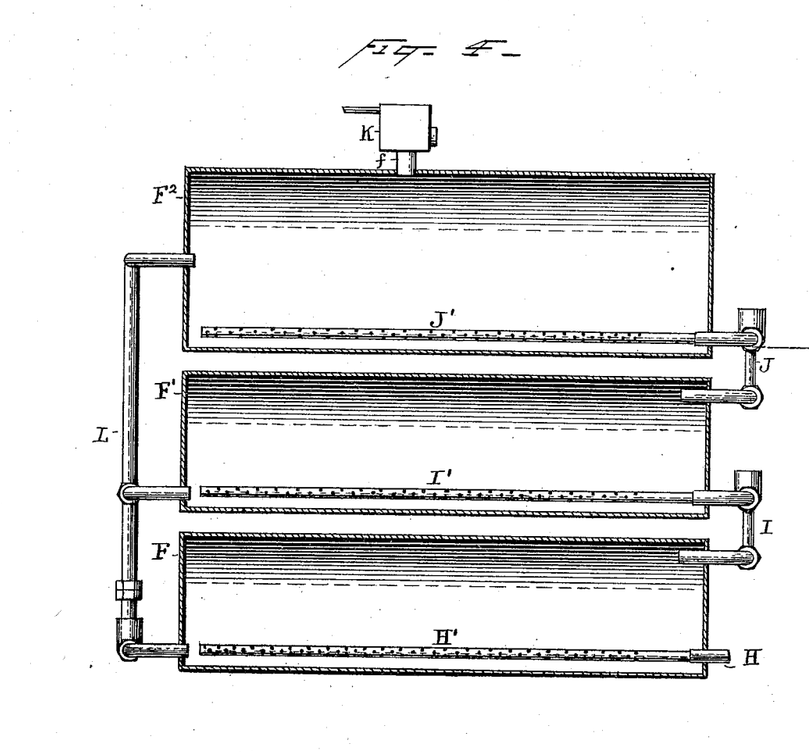
Fig. 4, a vertical section through one series of generators, the section taken on line $yy$ of Fig. 1.
Figure 5:
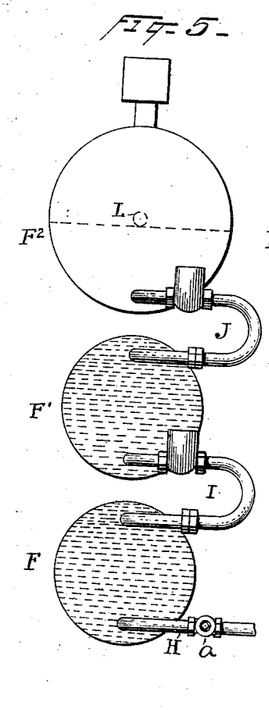
Figs. 5 to 7, inclusive, are diagrammatic representations of the generators, illustrative of the operation of charging them with the aqua-ammonia.

The generators for each part are arranged in a series of three or more, and they are placed one above the other. The generators of one series (that on the left of Fig. 1) are designated by the letters F F′ F², and those of the other series are designated by the letters G G′ G², proceeding from the bottom upward to the top, corresponding to the order in which the distillation and absorption are carried on. At the front end of the generator F, Fig. 1, a pipe H, fitted with a cock $a$, enters the head of the generator and connects inside of the generator with a perforated pipe H′, that is closed at its inner end. The said pipe H enters the head near the bottom of the generator and the perforated pipe is close to the bottom of the generator, as seen more clearly in Fig. 4. Between the bottom generator F and the generator F′, immediately above it, is a U-shaped pipe I, the lower end of which enters the head of generator F near the top, and the upper end enters the head of generator F′ near the bottom and connects with a perforated pipe I′ inside of the generator. In the upper member of the U-shaped pipe is a valve-casing $d$, in which is a check-valve $c$, arranged to open toward the end of the pipe that enters generator F′, so as to permit gas or liquor to flow into said generator F′ but check any outflow therefrom. Between generators F′ and F² there is another U-shaped pipe J, the lower end of which enters the head of generator F′ near the top of the generator, and the upper end enters the head of the generator F² near the bottom and connects with a perforated pipe J′ inside of the said generator, near the bottom thereof. In the upper member of the U-shaped pipe J there is a valve-casing $d$, in which is a check-valve $e$, opening toward the end of the pipe that enters the generator F², so as to permit gas and liquor to enter said generator and check the outflow therefrom. Above the generator F² is a drum K, that communicates with the interior of the said generator through a pipe $f$.

Figure 2:
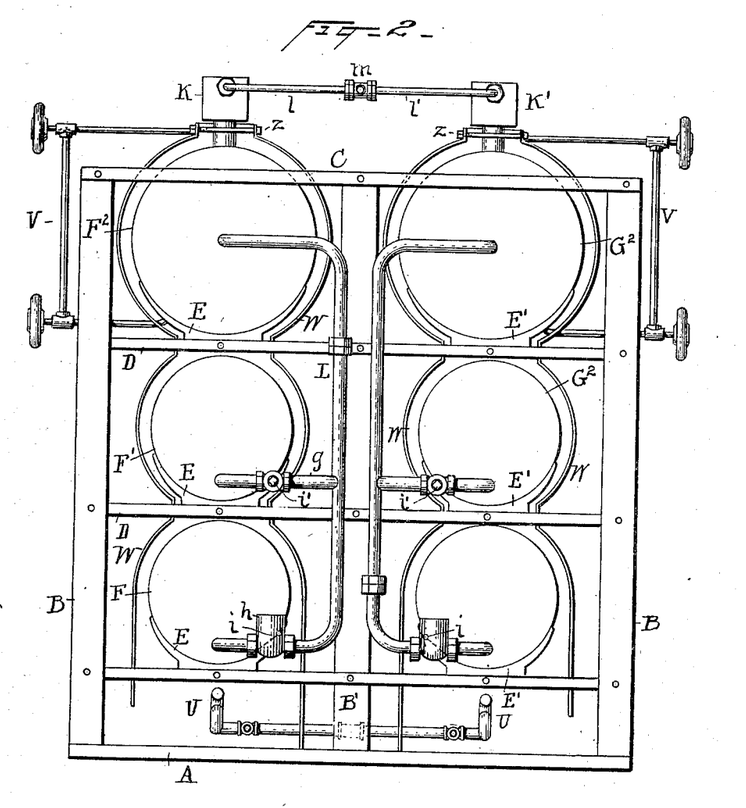
Fig. 2, a rear end elevation of the same.
Figure 3:
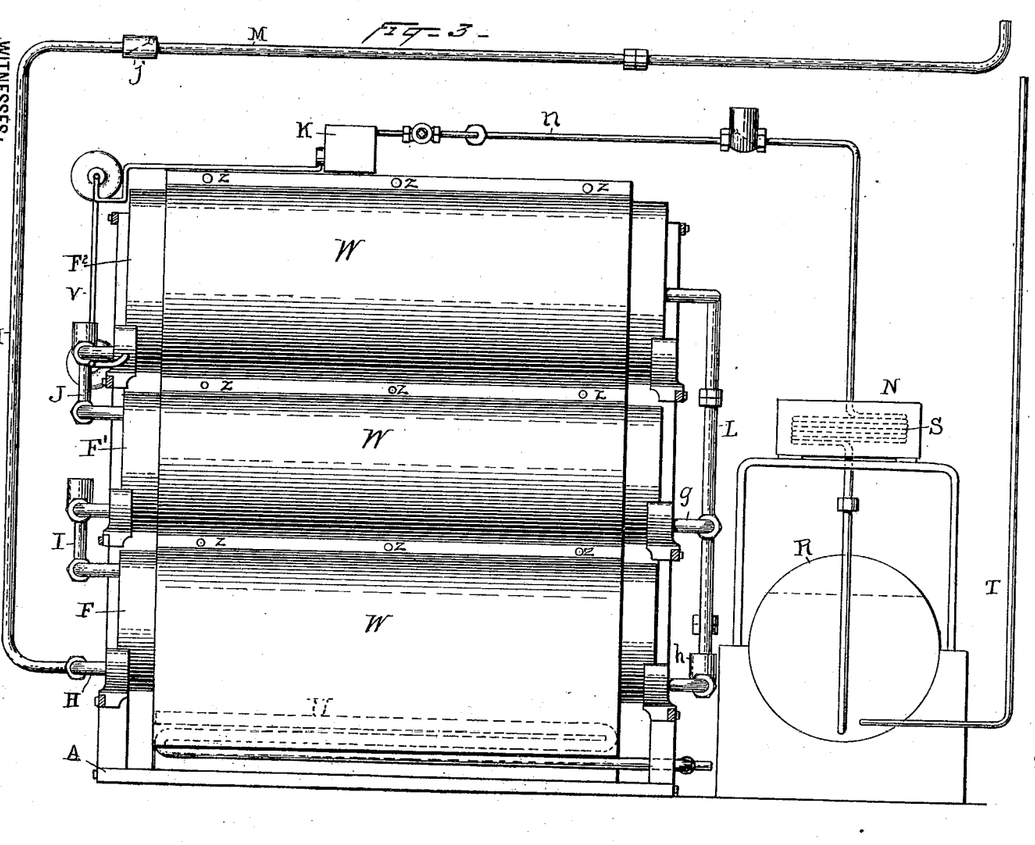
Fig. 3, a sectional side elevation of the apparatus, the section taken on line $xx$ of Fig. 1.

At the rear end of the apparatus (see Fig. 2) the series of generators are connected together by a pipe L, the upper end of which enters the head of the generator F² at the center and the lower end of which enters the generator F near the bottom, while the branch pipe $g$ enters the head of the generator F′ near the bottom. In this pipe, near the bottom end, is a valve-chamber $h$, in which is a check-valve $i$, opened toward the end of the pipe. In the branch $g$ is a cock $i'$.

The generators G G′ G² are fitted with a system of pipes similar to those of generators F F′ F², which are correspondingly lettered, as are also the valve-casing and check-valve. The perforated pipes inside of the generators G G′ G² are not, however, shown; but the construction and arrangement of these perforated pipes are precisely the same and the check-valves operated in the same manner as are those of the generators F F′ F². The ends of the pipes H H′ enter, respectively, the generators F G.

M is a pipe that connects by a T-joint with the pipes H H′ and leads thence to the exit end of the refrigerating-coil, which is not shown in the drawings. In this pipe is a check-valve $j$, opening toward the end of the pipe that connects with the pipes H H′ to check back pressure from the generators F or G to the refrigerating-coil.

Drums K K′ above the generators F² G² have pipes $l\ l'$ leading from them and which are connected together in a T-coupling $m$, and from this T-coupling a pipe $n$ leads to the condenser-tank N, and from the condenser-tank it is carried to the receiver R, and its end is passed through the head of the receiver near the bottom. Within the condenser-tank a coil S is interposed in the pipe N. A pipe T is passed into the head of the receiver near the bottom and from there carried to and connected with the refrigerating-coil at the entrance end of the said refrigerating-coil, which, however, is not shown in the drawings.

The operation of this system is conveniently divided into three parts — namely, charging the generators with aqua-ammonia, distilling the aqua-ammonia, and returning the expanded gas after it has done its duty in the refrigerating-coil to the weak liquor from which it was distilled and bringing about the absorption of the expanded gas after it has done its duty in the refrigerating-coil by the weak liquor and through this absorption recharging the generators with the exact amount of rich liquor which they contained before the distillation took place.

*Charging the generators.*—To charge one system of generators—say F F′ F²—an ammonia-pump is connected with the cock in the pipe H, next to the generator F, and aqua-ammonia at 26° Baumé is pumped into the generator F from the tank in which it is stored.

Figure 6:
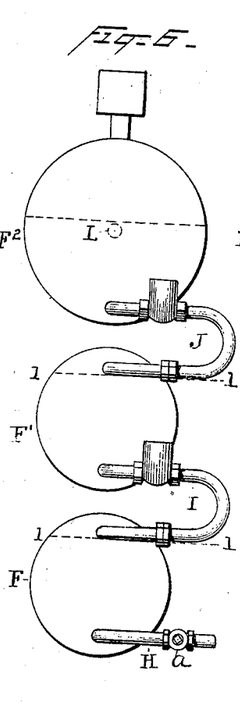

The ammonia is driven through the bottom generator F, thence through the connecting U-shaped pipe I up into the generator F', through this generator, and up into the generator F² through the U-shaped pipe J until enough has been pumped in to fill the upper generator up to the level of the equalizing-pipe L at the center of the said generator, the gage-glass V, connected with the generator F², showing the height which the liquor attains in the said generator. At this stage the generators F F' and the connecting U-shaped pipes I J are all filled with ammonia, while the generator F² is only filled up to the end of the equalizing-pipe L. Hence there is a surplus in the generators F F', which it is necessary to get out. For this purpose the burners under the bottom generator F are started, and by means of the heat the liquor in generators F F' is expanded and rises up into the top generator F², the check-valves opening inward permitting it to pass, but preventing its return. This outflow from the generators F F' continues until the level of the liquor in generators F F' drops below the ends of the U-shaped pipes at the top of the receiving-cylinders, as indicated by the dotted lines 1 1, Fig. 6.

It can be easily ascertained when the proper amount of liquor has been expelled from the generators F F' by the rise of liquor in the gage-glass of generators F², it having already been determined how high the liquor will have to rise in that glass to reduce the liquor in the generators F F' to the required level and the gage-glass properly marked. When the proper quantity of liquor has been forced into the generator F², the burners are extinguished. The excess of ammonia in generator F² is next taken out by opening the cock in equalizing-pipe L, whereupon the excess of ammonia in the generator F²—that is, the amount above the end of the equalizing-pipe in the said generator—runs off through the equalizing-pipe into the generator F and thence out through the pipe H and back into the tank from which it was obtained. By this means the series of connected generators are charged with the exact quantity of aqua-ammonia required for the subsequent steps of the process or operation. The generators G G' G² are charged in the same manner through the cock a' of pipe H.

*Distillation of the aqua-ammonia.*—The generators being properly charged, the burners are lighted to heat up the liquor and the operation proceeds as follows: The ammonia-gas as it is generated is driven off and accumulates in the upper part of the generator F. When the pressure is great enough, it forces open the check-valve in the U-shaped pipe I and enters the generator F', the ammonia in which is also heated by the heat ascending from below and directed around it by the jacket. From the generator F' the gas coming from generator F and that generated in generator F' enters through the U-shaped pipe J and passes into generator F², forcing the check-valve open by its own pressure. The distillation of the bodies of ammonia in the several generators then proceeds until the pressure reaches about one hundred and twenty pounds to the square inch, by which time most of the ammonia has been driven off from the liquor in the generators F F' and carried up into the generator F². When the above pressure has been reached, the cock in the pipe leading to the condenser is opened and the gas passes to the condenser, where it is condensed into anhydrous ammonia and forced into the receiver R under a pressure of not less than one hundred and twenty pounds to the square inch. The distillation must be continued until all the gases have been driven off from the liquor in the lower generators and the greater part from that in the top generator. This will be shown by the lowering of the liquor in the gage-glass of the generator F², the point to which it must fall to indicate the completion of the distillation being ascertained by testing the liquor from time to time when the first run is made and the gage-glass marked. This will have to be done but once, as a measure of the gage-glass will be taken or mark made thereon. When all the gas has been driven off, the burners are extinguished and the cock in the condenser-pipe closed. The quantity of liquor remaining in the generators at this stage is illustrated approximately in Fig. 8, where it will be observed that the quantity of liquor in each is reduced from the charge level of the strong liquor indicated by the lines 1 1, 1 1, 1 1 to the lines 2 2, 2 2, 2 2 drawn across the generators in Fig. 8, which indicate the quantity of weak liquor remaining after distillation.

In generators F F' practically all the ammonia is distilled out and the liquor completely impoverished, being but 10° Baumé, equal to water by that scale; but in generator F², owing to the greater bulk, the overcharging from the cylinders below, and the slightly shorter time during which the distillation is carried on, the weak liquor is approximately at about 12° Baumé, thus containing about 2° of ammonia. When the heat is extinguished and the exit of the gas from the top generator and drum is stopped by closing the cock leading to the condenser, the space above the weak liquor in the generators and also in the drum above the tops of the liquor will be filled with gas. The liquor will now cool down, and the gas remaining in each of the generators will be absorbed into the weak liquor contained in the generator, and that which is in the drum will also be absorbed by the weak liquor in generator F². By this reabsorption of the gas the body of the weak liquor in each of the generators will be increased more or less, and if there be sufficient in the top generator F² to raise the level of the weak liquor above the end of the equalizing-pipe this excess will flow through the equalizing-pipe down into the bottom generator F, which having been exposed to the greater heat will take up the oversupply until the liquor in the top generator falls below the end of the equalizing-pipe, whereby the body of liquor in the bottom generator F will be increased to the quantity it contained when originally charged, less the amount of gas distilled over and condensed into anhydrous ammonia.

With the cooling of the liquor in the generators the gas remaining in them will be taken up or absorbed by the weak liquor in the respective generators, and thus a vacuum will be formed in each generator and also in the drum over the top generator.

The vacuum in generators F F' holds the check-valve between the generators closed, and thus the generators retain their respective bodies of liquor that remain of the original charge after driving off the gas, so that by restoring to the weak liquor in each generator the quantity of gas taken out the liquor will be brought up to its original bulk and its original strength of 26°. This result is accomplished by returning the gas to the generators after it has performed its duty in the refrigerating-coil and causing it to be taken up or reabsorbed by the respective bodies of weak liquor in the several generators.

Figures 8, 9:
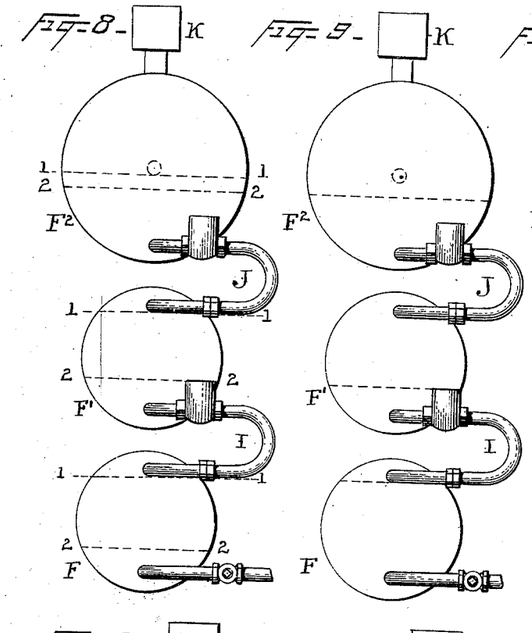
Figs. 8 to 12 are diagrammatic representations of the generators, illustrative of the process of absorption as it proceeds progressively in the series of generators.
Figure 10:
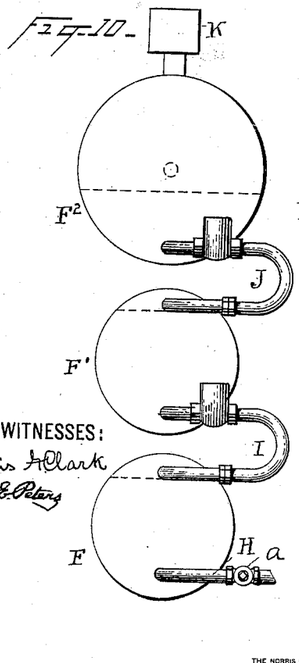
Figure 11:
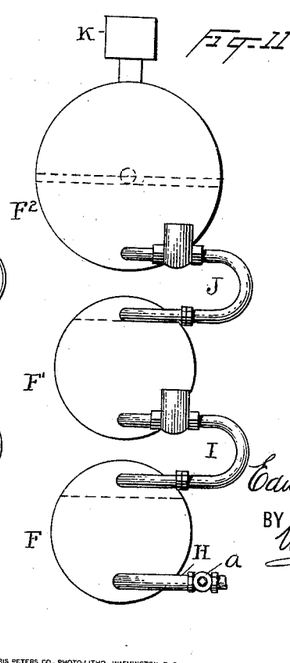

*Absorption of the expanded gas.*—When the weak liquor in the vessels cools down after distillation and the gas remaining in them after the cock in the pipe leading to the condenser is closed has been absorbed, the weak liquor is at about the level indicated by the broken lines 2 2 drawn across the vessels in Fig. 8, and a partial vacuum exists in all the vessels. The strength of the liquor in vessels F F' is about the same—*i. e.*, approximately 10° Baumé—but in F² it is about 12°, the difference resulting from the distillation being carried on somewhat longer in the lower vessels than in the topmost one. While refrigeration is going on, the cock in the branch of the return-pipe M, leading to the bottom vessel F, is open, and the gas expanding in the refrigerating-coil is driven by its own expansive force and by the suction produced by the vacuum in the vessel F into the perforated pipe, and drawn thence in small jets into the weak liquor. The weak liquor being cold absorption begins at once, the jets of gas passing rapidly through the liquor, by which in the early stages of the process all or the greater part of it entering the vessel is absorbed, but as the absorption progresses the temperature of the liquor rises, absorption becomes less active, and more and more of the gas passes into the space above the liquor until the pressure and temperature within the vessel checks or retards absorption. Before, however, the pressure increases enough to close the check-valve in the return-pipe M against the incoming expanded gas or to sensibly interfere with its inflow it lifts the check-valve in the pipe I, thereby opening a passage for the hot gas into the vessel F', through which it is rapidly drawn by the suction produced by the presence of the vacuum in the vessel F' and the pressure, and into the perforated pipe I', and from thence is pulled through the perforations therein into the cold weak liquor in the vessel, and absorption proceeds. The successive operations above described, beginning with absorption and continuing with the rising of the temperature of the liquor, decreasing absorption, the accumulation of gas, the development of pressure and heat, the withdrawal of hot gas from the vessel, and the progression of absorption constitute a cycle of sequential operations or effects, which is repeated in the successive vessels until the liquor absorbs enough of the inflowing gas to raise it to the required strength and volume.

Cycles of operations like those heretofore described continue until the liquor in the vessels is raised to its original strength and volume. The check-valves in the pipes I and J are given a pulsating motion opening and closing in obedience to the rise and fall of pressure in the vessels, thus permitting the accumulated heat and gas to be withdrawn from the lower vessels up into the cold weak liquor in the vessels above by the suction resulting from the presence of the vacuum in the upper vessel and the pressure in the lower vessel.

In case the full charge of ammonia-gas has not been absorbed and the bodies of liquor in one or more of the several vessels are deficient in both strength and volume, which it is required shall be the same as before distillation, the absorption will be completed as follows: When absorption ceases more or less completely in vessel F, as it does about the time the accumulated gas in vessel F' is being drawn up into vessel F², the temperature of the liquor in vessel F is lowered by the removal of the hot gas into the next or successive vessels of the series and the cold expanded gas flowing into and through it from the refrigerating-coil. The pipe L leads from the space above the liquor in the top vessel F² into the bottom vessel F. Hence at one end of the said pipe there is a body of hot ammonia-gas under pressure and at the other end a body of cold liquor or gas, or both. The gas enters the pipe, and if its pressure is greater than the pressure now existing in the vessel F it lifts the check-valve $i$, passes the same, and enters the vessel F. The gas in the pipe runs into the cold liquor in the vessel and an influx of the gas into the cold liquor takes place, pressure in the vessel F² is reduced, and hot gas enters the liquor in F, a circulation of the gas is established, and absorption proceeds in the vessels where the liquor has not become saturated and is kept up so long as the gas continues to expand and enters the bottom vessel. The progress of the absorption can be ascertained by the rise of the liquor in the glass gage V on the upper vessel F².

Figure 7:
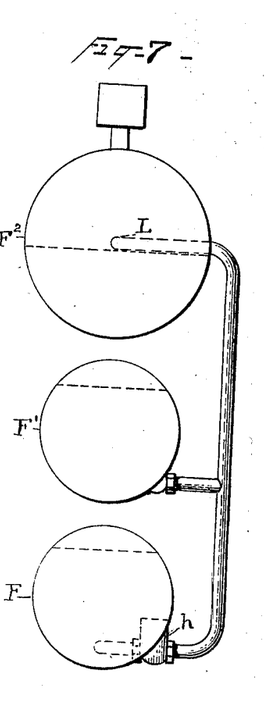
Figure 12:
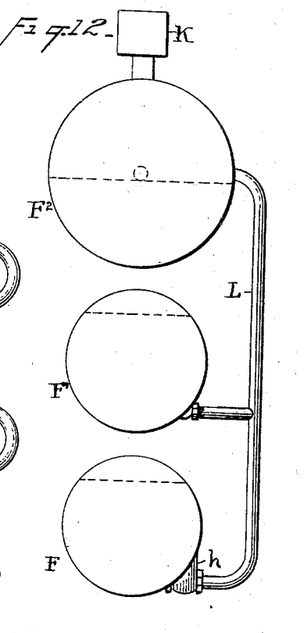

Owing to absorption, the influx of hot gas, and pressure all the vessels when expansion ceases are more or less warm. As they cool down the gas remaining in the spaces above the liquor is gradually absorbed and a vacuum re-forms in each of the vessels, and the volume of liquor in the several vessels will be about the same as before distillation, as indicated by the horizontal broken lines drawn across the vessels in Fig. 12, which correspond to those in Fig. 7, which indicate the levels of the liquor in the several vessels when the charging is finished.

The generators may be heated by any suitable means, and the apparatus therefor is placed under the bottom one of each series of generators, as indicated by the burners U U'.

W W are jackets that inclose the sides of the generators and serve to direct the heat arising from below against the generators and also prevent the heat under one series of generators where distillation is going on from affecting the generators of the other series, which should be kept as cool as possible, in order that absorption of the inflowing gas may not be interfered with when refrigeration is going on. The inner side of each jacket extends down to the floor or base of the frame, but the outer side is shorter, and thus a passage is left for the air to reach the burners. The two sides of the jacket are connected by lateral bolts z z z, passed through the contracted parts of the jacket between the lower and above the topmost generators. The products of combustion pass up through the space between the jackets and the generators, and at the top they may be led through a pipe into the chimney or stack.

I claim—

1. In artificial refrigeration the process herein described consisting in distilling the gas from a series of separate bodies of aqua-ammonia, condensing and expanding the same, and absorbing the expanded gas successively and progressively into a series of separate bodies of weak liquor remaining from previous distillation each of which is weaker than the preceding body.

2. In artificial refrigeration the process herein described consisting in distilling the gas continuously from a series of separate bodies of aqua-ammonia, condensing and expanding the same, and absorbing the expanded gas continuously and successively into a series of bodies of weak liquor remaining from previous distillation each of which is weaker than the preceding body.

3. In artificial refrigeration the process herein described consisting in distilling the gas from a series of bodies of aqua-ammonia, condensing and expanding the same, and absorbing the expanded gas under a vacuum continuously and successively into a series of bodies of weak liquor remaining from previous distillation each of which is weaker than the preceding body.

4. In artificial refrigeration the process herein described consisting in distilling the gas from a body of aqua-ammonia, condensing and expanding the same, absorbing the expanded gas under a vacuum in a body of weak liquor remaining from previous distillation, and when pressure and temperature arise and absorption is checked, forcibly removing the hot gas and continuing the absorption.

5. In artificial refrigeration the process herein described consisting in distilling the gas from separate bodies of aqua-ammonia, condensing and expanding the same, absorbing the expanded gas under a vacuum in one of a series of bodies of weak liquor remaining from previous distillation, and when pressure and temperature arise and absorption is checked, removing the hot gas by suction into the next of the series of bodies of weak liquor, and absorbing it therein under a vacuum.

6. In artificial refrigeration the process herein described consisting in distilling the gas from separate bodies of aqua-ammonia, condensing and expanding the same, absorbing the expanded gas under a vacuum in the first of a series of bodies of weak liquor remaining from previous distillation, and when pressure and temperature arise and absorption is checked, removing the hot gas by suction into the next of the series of bodies of weak liquor, and absorbing the gas in the same under a vacuum, and when pressure and temperature arise and absorption is checked, removing the hot gas into the next of the series of bodies of weak liquor and absorbing it therein under a vacuum.

7. In artificial refrigeration the process herein described consisting in distilling the gas from separate bodies of aqua-ammonia, condensing and expanding the same, absorbing the gas under a vacuum into a series of bodies of weak liquor remaining from previous distillation until pressure and temperature arise, and when the pressure in the last of the series of bodies exceeds the pressure in the other bodies removing the hot gas from the last to the first body, from thence into the second body, and from the latter into the last body as the pressure falls below the pressure in the second body.

8. In artificial refrigeration the process herein described consisting in distilling the gas from separate bodies of aqua-ammonia contained in a series of vessels, permitting the cooling down of the same to form a vacuum in each, condensing and expanding the gas, absorbing the same successively in separate bodies of weak liquor remaining in another series of vessels from a previous distillation, beginning with the first, and when pressure and temperature arise, proceeding to the next body and repeating this operation through the series of bodies to the last.

9. In artificial refrigeration the process herein described consisting in distilling the gas from separate bodies of aqua-ammonia contained in a series of vessels, permitting the cooling down of the same to form a vacuum in each, condensing and expanding the gas, absorbing the same successively into separate bodies of weak liquor remaining in another series of vessels from a previous distillation, and when absorption is checked by the rise of temperature, removing the gas from the vessel in which the pressure arises to the next vessel in the series, and repeating this operation until pressure and temperature arise in the last vessel, then passing the gas from the former into the first vessel of the series, by means of decreased pressure in the latter and thence successively in like manner into the other vessels of the series in their order and then back again to the first vessel, and repeating this cycle of operations until absorption is completed and the pressure is uniform in the several vessels.

10. In artificial refrigeration the process herein described consisting in absorbing the expanded gas under a vacuum successively in separate bodies of weak liquor contained in a series of vessels, and when pressure and temperature arise in one of the vessels, removing the accumulated gas by suction into the next vessel where a vacuum exists and absorbing it in the weak liquor therein, and continuing the removal of gas by suction from the vessel in which the higher pressure exists to the vessel in which a lower pressure exists until the same pressure exists approximately in all the vessels.

11. In artificial refrigeration the process herein described consisting in absorbing the expanded gas under a vacuum successively in a series of bodies of weak liquor contained in a series of separate vessels, and when pressure in one of the vessels rises above the pressure in the next vessel of the series, passing the gas into the latter vessel and absorbing it in the weak liquor therein, continuing to pass the unabsorbed gas from the vessel in which the higher pressure arises to the vessel in which the lower pressure exists to the end of the series of vessels, and when the pressure and temperature in the last vessel exceed the pressure and temperature in the first vessel of the series, passing the gas from the last vessel into the first, and thence successively through the series of vessels as the pressure in the vessel receiving the gas exceeds the pressure in the next vessel until all the gas has been absorbed.

In testimony that I claim the invention above set forth I do affix my signature in presence of two witnesses.

EDWARD W. HOWELL.

Witnesses:
 FREDK. HAYNES,
 WILTON C. DONN.